(12) United States Patent
Wang et al.

(10) Patent No.: US 8,756,296 B2
(45) Date of Patent: Jun. 17, 2014

(54) METHOD, DEVICE AND SYSTEM FOR DISTRIBUTING FILE DATA

(75) Inventors: Zhibing Wang, Shenzhen (CN);
Zhefeng Yan, Shenzhen (CN);
Chuansong Xue, Shenzhen (CN);
Haohua Chen, Shenzhen (CN); Jiahao Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1399 days.

(21) Appl. No.: 12/487,473

(22) Filed: Jun. 18, 2009

(65) Prior Publication Data
US 2009/0259667 A1    Oct. 15, 2009

Related U.S. Application Data

(63) Continuation of application No. PCT/CN2008/070159, filed on Jan. 22, 2008.

(30) Foreign Application Priority Data

May 21, 2007    (CN) .......................... 2007 1 0102100

(51) Int. Cl.
*G06F 15/16*    (2006.01)
*G06F 15/177*    (2006.01)
*H04L 12/28*    (2006.01)

(52) U.S. Cl.
USPC ............ 709/219; 709/221; 709/218; 370/392

(58) Field of Classification Search
None
See application file for complete search history.

(56) References Cited

U.S. PATENT DOCUMENTS

| | | | | |
|---|---|---|---|---|
| 7,379,428 B2 * | 5/2008 | Xu et al. | | 370/254 |
| 7,647,424 B2 * | 1/2010 | Kim et al. | | 709/238 |
| 7,783,777 B1 * | 8/2010 | Pabla et al. | | 709/238 |
| 8,332,484 B2 * | 12/2012 | Afergan et al. | | 709/218 |

(Continued)

FOREIGN PATENT DOCUMENTS

| CN | 1819591 | 8/2006 |
|---|---|---|
| CN | 1859334 | 11/2006 |

(Continued)

OTHER PUBLICATIONS

Xinyan Zhang et al., "CoolStreaming/DONet: A Data-Driven Overlay Network for Efficient Live Media Streaming", Department of Information Engineering, The Chinese University of Hong Kong, pp. 1-28.

(Continued)

*Primary Examiner* — Wen-Tai Lin
(74) *Attorney, Agent, or Firm* — Staas & Halsey LLP

(57) ABSTRACT

A method for distributing file data includes: obtaining a first request message of a first client for downloading a first file, and determining an autonomous system (AS) where the first client is located; searching the AS for edge servers that support peer to peer (ES-Ps), and returning the address of at least one ES-P storing the first file to the first client; and sending the first file stored in the ES-P to the first client according to the client information returned by the ES-P. Related devices and systems are also provided. The present invention may speed up the file data distribution, reduce the restriction of the file data distribution due to fixed bandwidth of the ES, and enable P2P data streams to be converged into an AS, thus reducing the impact on backbone networks.

5 Claims, 13 Drawing Sheets

(56) References Cited

U.S. PATENT DOCUMENTS

| | | | |
|---|---|---|---|
| 8,458,333 B1* | 6/2013 | Stoica et al. | 709/226 |
| 2002/0163882 A1 | 11/2002 | Bornstein et al. | |
| 2004/0085912 A1 | 5/2004 | Xu et al. | |
| 2006/0184688 A1 | 8/2006 | Ganguly et al. | |
| 2007/0064702 A1* | 3/2007 | Bates et al. | 370/392 |

FOREIGN PATENT DOCUMENTS

| | | |
|---|---|---|
| CN | 1889490 | 1/2007 |
| CN | 1909509 | 2/2007 |
| CN | 1941736 | 4/2007 |
| CN | 101005369 | 7/2007 |
| CN | 101051980 | 10/2007 |
| EP | 1617591 | 1/2006 |

OTHER PUBLICATIONS

Bram Cohen, "The BitTorrent Protocol Specification", www.BitTorrent.org, Jan. 10, 2008, pp. 1-8.

Meng Zhang et al., "Large-Scale Live Media Streaming over Peer-to-Peer Networks through Global Internet", Department of Computer Science and Technology, P2P MMS 05', Nov. 11, 2005, pp. 21-28.

European Search Report, mailed Aug. 3, 2010, in corresponding European Application No. 08700815.7.

English-Language Translation of the PCT Written Opinion of the International Search Authority, mailed Apr. 30, 2008, in corresponding PCT Application No. PCT/CN2008/070159.

European Office Action issued Sep. 20, 2012 in corresponding European Patent Application No. 08700815.7.

* cited by examiner

METHOD, DEVICE AND SYSTEM FOR DISTRIBUTING FILE DATA

CROSS-REFERENCE TO RELATED APPLICATIONS

This application is a continuation of International Application No. PCT/CN2008/070159, filed on Jan. 22, 2008, which claims the benefit of Chinese Patent Application No. 200710102100.5, filed on May 21, 2007, both of which are hereby incorporated by reference in their entireties.

FIELD OF THE INVENTION

The present invention relates to network information technologies, and in particular, to a content distribution technology. Specifically, the present invention relates to a method, device and system for distributing contents in a content or media distribution network.

BACKGROUND OF THE INVENTION

With the development and popularity of multimedia communications, there are increasing requirements for Internet contents and applications. A content or media distribution network (CDN or MDN) technology emerges to overcome the problem of low Internet connection speed on original networks.

The CDN is a network architecture and integrated system based on the content distribution technology. The content distribution technology is a distribution cache technology based on traffic management, load balancing and distributed technologies. It places a cache server at an edge node of the Internet, and distributes file contents from a source node to the network edge that is closest to a user through load balancing, thus allocating and accessing proximate resources and responding to multimedia information faster.

FIG. 1 shows a structure of a CDN or MDN in the prior art. The CDN or MDN structure includes:

an end user portal (EU-Portal), adapted to enable a user to access contents or media, including content or media presentation and user login authentication, where the user can add, delete, query or modify personal attributes by logging in to the portal;

a request routing system (RRS), working as the portal for the user request and the scheduling center in the media distribution network, and adapted to balance the load distribution at each content cache site, select a best access site according to the user request, and improve the availability of a site. A content route is set according to the network topology, network delay, and server load and rule; a best site is specified to provide services according to a specific content request. A content routing system is adapted to set the route according to multiple factors, including proximity between the site and the user, content availability, network load, and device condition; and an edge server (ES), adapted to provide streaming services for the user, act as the streaming proxy, monitor the user login/logout, and provide a usage mediator (UM) with a real consumption record of the user.

As shown in the network structure in FIG. 1, after obtaining a content or media request of the user, the RRS determines at least one proper ES according to a series of policies; the user originates the content or media request to the determined ES; if the requested content exists in the ES, the ES returns the content to the user; otherwise, the content cache of the ES pulls the requested content from the original server to a local position, and then returns the requested content to the user.

During the implementation of the prior art, the inventor discovers that the bandwidth of the ES through which the file data is provided to the user is fixed, so only limited number of users can be supported at the same time. To meet the requirements of users, the capability of the edge node needs to be increased linearly with the increase of users. This requires huge investments in the edge node.

SUMMARY OF THE INVENTION

An embodiment of the present invention provides a method for distributing file data to reduce the restriction on the file data distribution due to fixed bandwidth of the ES. Another embodiment of the present invention provides devices related to the method for distributing file data.

The method according to an embodiment of the present invention includes:

obtaining a third request of a first client for downloading a first file; obtaining information of other clients that are downloading the first file in an autonomous system (AS) of the first client, according to the third request of the client for downloading the first file and information about the mapping between the client and the first file recorded in the an edge server that supporting peer to peer (ES-P); and returning the information of other clients to the first client to obtain the first file.

An RRS system according to an embodiment of the present invention includes:

a first connection managing module, adapted to manage data interactions with external interfaces, wherein the data interactions includes: obtaining a first request message of a first client for downloading a first file, and returning an address of an edge server that supports peer to peer (ES-P) obtained by a user scheduler to the first client;

a file managing module, adapted to store file information, including the mapping between a file ID and the address of the ES-P in an AS; and the user scheduler, adapted to allocate the ES-P address according to the file information stored in the file managing module; wherein the allocation includes: obtaining the ID of the first file carried in the first request message, and searching for the address of ES-P storing the first file in the AS of the first client according to the ID of the first file.

An ES according to an embodiment of the present invention includes:

a second connection managing module, adapted to manage data interactions with external interfaces, wherein the data interactions comprise: receiving a third request message of a first client for downloading a first file, and returning information of clients downloading the first file;

a storage module, adapted to record the mapping between the information of clients that download the first file and the ID of the first file in the AS of the client; and a session managing module, adapted to obtain the ID of the first file carried in the third request message, and search the storage module for the information of clients downloading the first file according to the ID of the first file.

A client according to an embodiment of the present invention includes:

a third connection managing module, adapted to manage data interactions with external interfaces, send a first request message for downloading a first file to an RRS that supports peer to peer (RRS-P), obtain the address of an ES from the RRS-P, send a second request message for downloading the first file to the ES-P, obtain the information of other devices downloading the first file returned by the ES-P, and interact with other devices after being called by a client managing module to obtain the data of the first file and store the data in a second cache managing module;

the client managing module, adapted to store the device information, including the information of the client or ES;

the second cache managing module, adapted to cache the data of the first file obtained by the third connection managing module; and a download managing module, adapted to write the data of the first file from the second cache managing module into a storage device.

A system for distributing file data according to an embodiment of the present invention includes an RRS-P and an ES-P, where:

the RRS-P is adapted to obtain a first request message of a first client for downloading a first file, determine an AS where the first client is located, search for the ES-P storing the first file in the AS, and return the address of at least one ES-P storing the first file to the first client; and the ES-P is adapted to return the information of other clients that are downloading the first file to the client according to the request of the client and the information about the mapping between the client and the first file recorded in the ES-P.

The technical solution according to embodiments of the present invention uses the MDN structure in the prior art to distribute files in peer to peer (P2P) mode. This utilizes the capability of the client, speeds up the file data distribution, and reduces the restriction on the file data distribution due to fixed bandwidth of the ES. In addition, among all the devices complying with P2P download requirements, the device in a point of presence (POP) where the client originating the file download request is located is selected first. Thus, P2P data streams are converged in an AS; disordered streams are effectively converged; and no impact of P2P disordered streams is imposed on backbone networks.

DETAILED DESCRIPTION OF THE EMBODIMENTS

The following describes the system architecture involved in an embodiment of the present invention. The concept of AS is involved during the implementation of the present invention. An AS is a network management area with independent routing policies and a unique interior gateway routing protocol. Those skilled in the art may classify ASs by specific network structures and features based on service requirements. For example, an AS is established based on the POP. The closer the distance to the POP is, the less the line signal loss is, and the more bandwidth guarantee the user can enjoy. The present invention does not intentionally limit the establishment and classification method of the ASs. The following describes an embodiment of the present invention, supposing an AS is established based on the POP.

This embodiment relates to an RRS, an ES, and a client, where the RRS, ES and client support the P2P technology. The RRS, ES and client that support the P2P technology are defined as a request routing system-peer (RRS-P), an edge server-peer (ES-P), and a P2P client.

The RRS-P is the scheduling server in the system and is responsible for scheduling P2P requests, creating and maintaining topology relations, providing a list of peer nodes to the P2P client, and implementing scheduling policies of an ES-P group based on load balancing.

Figure 1:
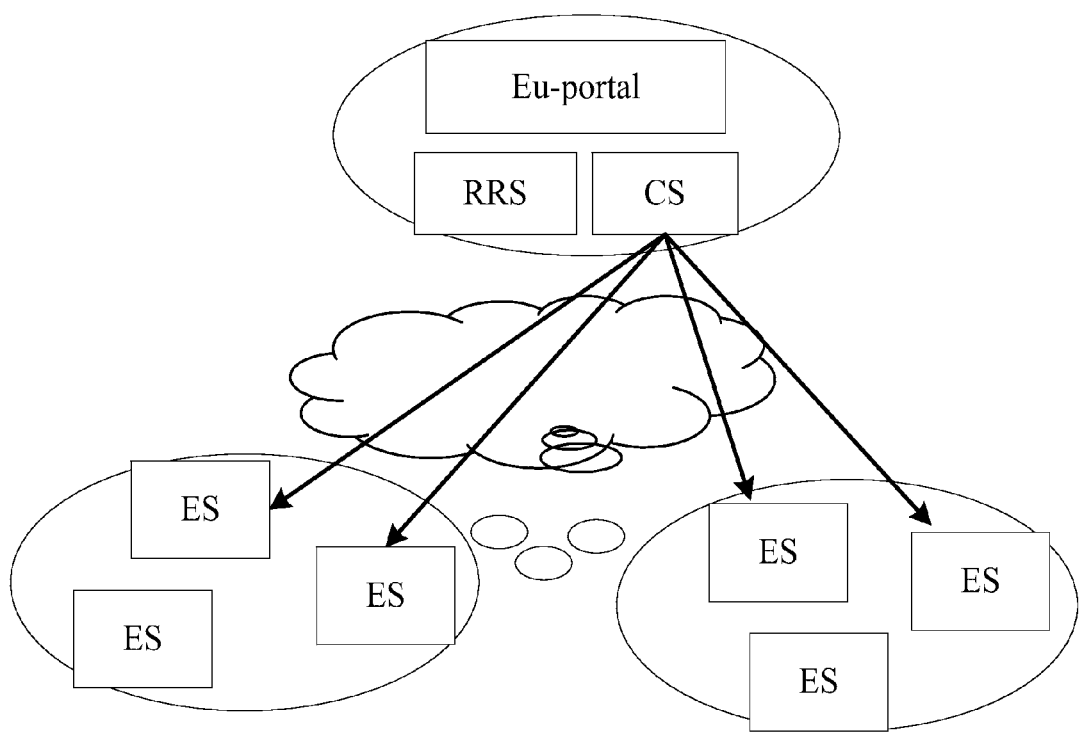
FIG. 1 shows an architecture of a CDN or MDN in the prior art.
Figure 2:
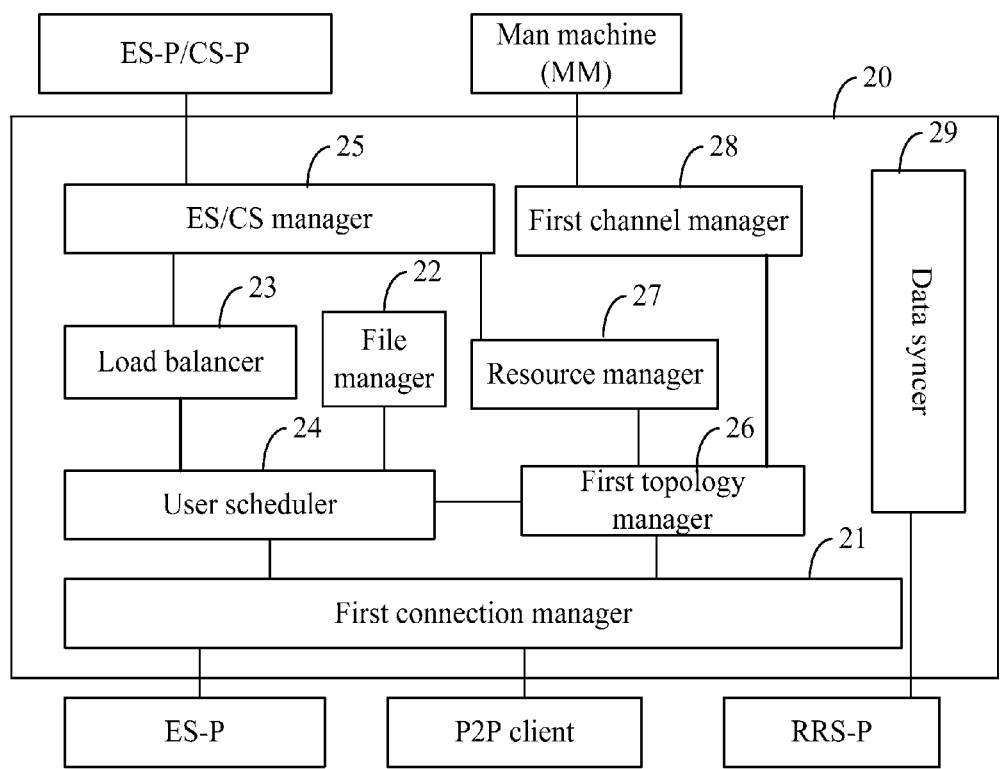
FIG. 2 shows a structure of an RRS-P according to an embodiment of the present invention.

FIG. 2 shows a structure of an RRS-P according to an embodiment of the present invention. As shown in FIG. 2, an RRS-P 20 includes a first connection managing module 21, a file managing module 22, a load balancer 23, and a user scheduler 24.

The first connection managing module 21 is adapted to manage the external interfaces of the RRS-P, and includes at least the following:

a message interface between the P2P client and the RRS-P, adapted to send a download request and a response message between the P2P client and the RRS-P, where the request message in this embodiment carries the hash value of a requested file, and the response message carries the IP address and port number of an ES; and a message interface between the ES-P and the RRS-P, adapted to send a download request and a response message between the ES-P and the RRS-P, where the request message carries the hash value of a requested file, and the response message carries two keywords: an ID indicating whether the requested file exists and information of the ES-P storing the requested file.

The file managing module 22 is responsible for storing and updating the file information, and storing the file information of each ES-P in each POP. When the file information in the ES-P is changed, the file information in the RRS-P is changed accordingly. Table 1 shows a storage format used in this embodiment. The storage format includes: a file ID, which is the hash value of the metadata information of the file, where the metadata information of the file includes the length of each file fragment and the hash value of each file fragment; a POP ID, which identifies the POP where the file is located; an ES-P ID, which identifies the ES-P where the file is located; a timestamp, which indicates the time when the storage record is added; and a completeness ID, which indicates whether all the data of the file is stored in the ES-P.

TABLE 1

| Hash Value of a File | POP ID | ES ID | Timestamp | Completeness ID |
| --- | --- | --- | --- | --- |

The format for storing the file information according to this embodiment includes a file ID, a POP ID, an ES-P ID, a timestamp, and a completeness ID. Those skilled in this art may extend or modify the preceding storage format. However, the mapping between the file ID and the POP where the file is located and between the file ID and the ES-P where the file is located must be reflected in the storage format according to this embodiment.

The load balancer 23 is adapted to calculate and balance the loads of the ES-P in the AS.

The user scheduler 24 is adapted to maintain the interface with the file managing module (an API interface may be used between the user scheduler and the file managing module), search for an ES-P where the file requested by the client is located according to the file ID by calling the file managing module, maintain the interface with the load balancer, and select the ES-P with the minimum load by calling the load balancer.

The operating principle of the RRS-P is hereinafter described in detail on the basis of the preceding structure of the RRS-P and with reference to FIG. 3 and FIG. 4.

Figure 3:
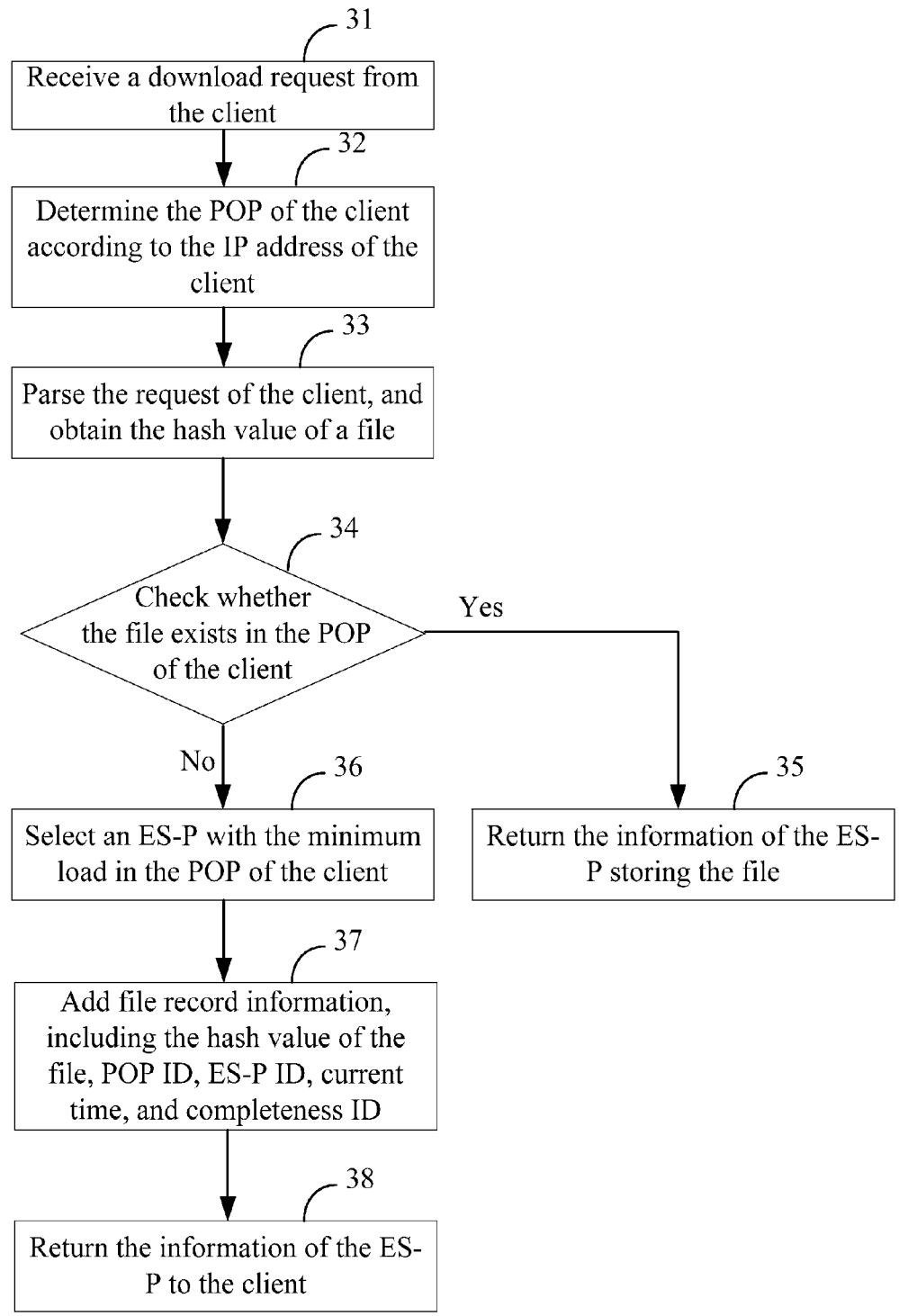
FIG. 3 shows a process of processing a file download request of a P2P client by the RRS-P according to an embodiment of the present invention.

FIG. 3 shows a process of processing a file download request of the P2P client by the RRS-P. The process includes the following steps:

Step 31: Obtaining a file download request message (i.e., a first request message) of the P2P client through the message interface between the P2P client and the RRS-P, where the request message carries the hash value of a requested file.

Step 32: Determining the POP of the P2P client according to the IP address of the P2P client.

Step 33: Parsing the first request message of the client. The user scheduler 24 obtains the hash value of the file (i.e., a first file) requested by the P2P client.

Step 34: The user scheduler checks whether the first file exists in the POP of the P2P client by calling the file managing module. If so, the process proceeds to step 35; otherwise the process proceeds to step 36.

Step 35: Sending a response message to the P2P client through the message interface between the P2P client and the RRS-P. The response message carries the information of the ES-P storing the first file that is searched out by the file managing module in the POP (e.g., the IP address and port number of the ES-P).

Step 36: The user scheduler calls the load balancer to select the ES-P with the minimum load in the POP of the P2P client.

Step 37: The file managing module adds record information according to a preset storage format, including the hash value of the first file, ID of the POP of the P2P client, and ID of the ES-P selected by the load balancer.

Step 38: Returning related information that includes the information of the ES-P (e.g., the IP address and port number of the ES-P) selected by the load balancer to the P2P client through the message interface between the P2P client and the RRS-P.

Figure 4:
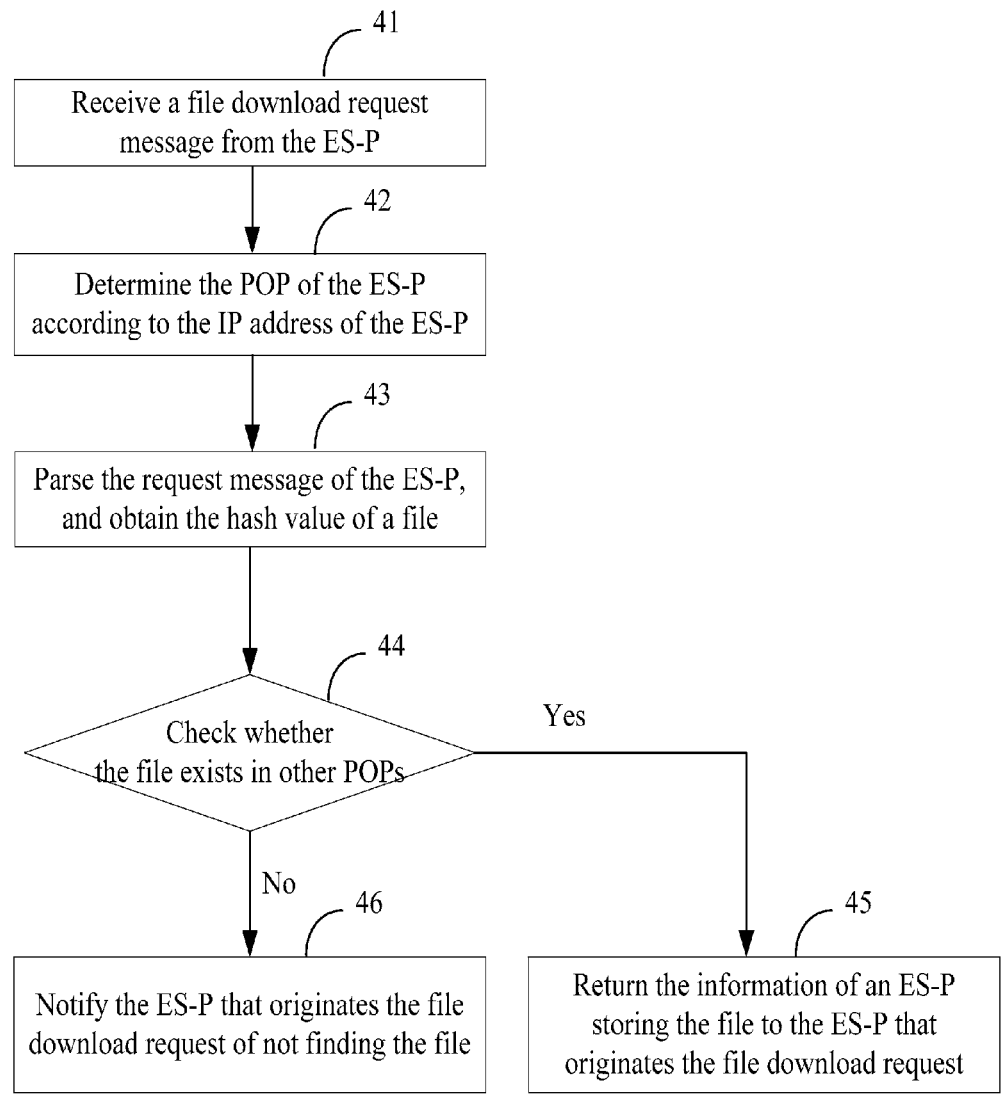
FIG. 4 shows a process of processing a file download request of an ES-P by the RRS-P according to an embodiment of the present invention.

FIG. 4 shows a process of processing a file download request of the ES-P by the RRS-P. The process includes the following steps:

Step 41: Obtaining a file download request message (i.e., a second request message) of the ES-P through the message interface between the ES-P and the RRS-P, where the request message carries the hash value of a requested file.

Step 42: Determining the POP of the ES-P according to the IP address of the ES-P.

Step 43: Parsing the second request message of the ES-P. The user scheduler obtains the hash value of the file (i.e., the first file) requested by the ES-P.

Step 44: The user scheduler checks whether the file requested by the ES-P exists in other POPs by calling the file managing module. If so, the process proceeds to step 45; otherwise, the process proceeds to step 46.

Step 45: Returning a response message to the ES-P that originates the file download request through the message interface between the ES-P and the RRS-P. The response message carries the information of the ES-P that is searched out by the file managing module in other POPs (e.g., the IP address and port number of the ES-P).

Step 46: Returning a response message indicating that the requested file does not exist to the ES-P that originates the file download request through the message interface between the ES-P and the RRS-P.

In the preceding embodiment of the RRS-P, if the first file does not exist in the POP of the P2P client, the load balancer is called to select the ES-P with the minimum load in the POP. Nevertheless, other policies may also be used during the implementation of the embodiments of the present invention to select the ES-P in the POP of the P2P client. For example, an ES-P may be selected according to the server performance, network traffic status or network where the P2P client is located. Accordingly, the load balancer used in the preceding embodiment may be replaced with other modules.

On the basis of the preceding structure of the RRS-P, the RRS-P may further include:

an ES/CS managing module 25, adapted to detect failures of the connected ES-P and a CS-P, and record the topology relation between the ES-P and the CS-P, where the CS-P is a center server (CS) that supports the P2P technology and is adapted to provide original data sources for each ES;

a first topology managing module 26, adapted to maintain the topology information between P2P clients and between ES-Ps in the AS according to the scheduling result of the user scheduler, and serve the P2P clients and the ES-Ps;

a resource managing module 27, adapted to support the resource leasing mode, record resources occupied by an operator according to the topology information stored in the first topology managing module, and check whether the number of resources occupied by the operator exceeds a preset upper limit;

a first channel managing module 28, adapted to obtain and record basic information of live broadcast channels, add or delete live broadcast channels, and send the processing result to the first topology managing module; and a data syncer 29, adapted to communicate with a standby RRS-P so as to update the active RRS-P and the standby RRS-P synchronously.

Figure 5:
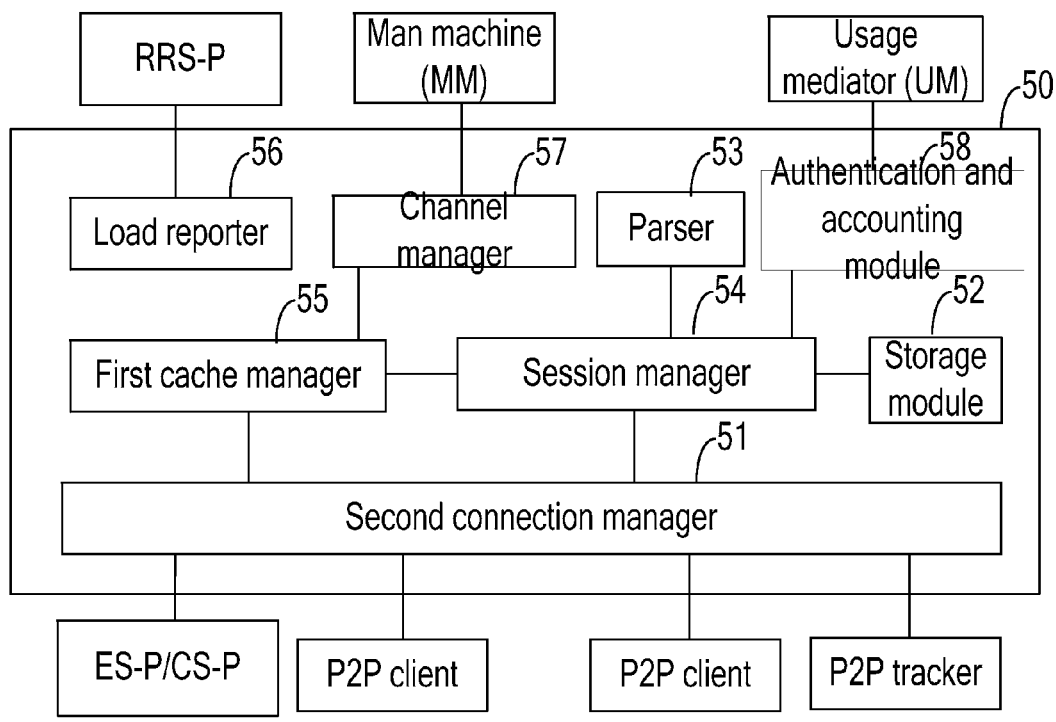
FIG. 5 shows a structure of an ES-P according to an embodiment of the present invention.

FIG. 5 shows a structure of an ES-P according to an embodiment of the present invention. As shown in FIG. 5, an ES-P 50 includes a second connection managing module 51, a storage module 52, a parser 53, a session managing module 54, and a first cache managing module 55.

The second connection managing module 51 is adapted to manage external interfaces of the ES-P, and is responsible for establishing, maintaining and removing data connection and signaling connection channels, where the external interfaces include:

a first message interface between a P2P client and an ES-P, adapted to send a download request and a response message between the P2P client and the ES-P, where the request message carries the hash value of a file, and the response message carries two keywords: whether to accept the file download request and the information of other clients downloading a same file;

an interface between ES-Ps, adapted to send a download request and a response message, where the download request message carries the hash value of a requested file, and the response message carries a keyword: whether to accept the request;

a message interface between an ES-P and an RRS-P (see the description of new interfaces of the RRS-P);

a second message interface between an ES-P and a P2P client, complying with related P2P transfer protocols, and adapted to transfer file data between the ES-P and other P2P clients over a P2P transfer protocol, for example, supposing the file data is transferred between an ES-P and a P2P client over the Bit Torrent (BT) protocol, the second message interface may be the interface between the ES-P and the BT client; and a message interface between an ES-P and a P2P accessorial server (e.g., a BT tracker), complying with related P2P transfer protocols.

The storage module 52 is adapted to record and update information of all the P2P clients downloading the file in the POP of the ES-P, and provide a P2P client that originates a request for downloading the file with the information of other clients that are downloading the file. Table 2 shows the information storage format of the storage module 52. The format includes: a file ID, which uses the hash value of the metadata information of a file, where the metadata information of the file includes the length of each file fragment and the hash value of each file fragment; and client information, which includes a list of P2P clients that are downloading the file in the POP. Reference can be made to a specific P2P transfer protocol for details of P2P clients.

TABLE 2

| Hash Value of a File | Client Information |
| --- | --- |

The parser 53 is adapted to parse a P2P protocol seed file that is sent by a P2P client and obtained by the second connection managing module, and obtain the file data, as a P2P client, by calling the second connection managing module over a P2P transfer protocol according the parsing result of the P2P protocol seed file; for example, the BT protocol is used.

The session managing module 54 is adapted to search for information of a P2P client downloading a file by calling the storage module, and parse the P2P protocol seed file by calling the parser. An API interface may be used between the session managing module and the storage module and between the session managing module and the parser.

The first cache managing module 55 is adapted to cache and manage the data of the first file obtained by the second connection managing module.

Figure 6:
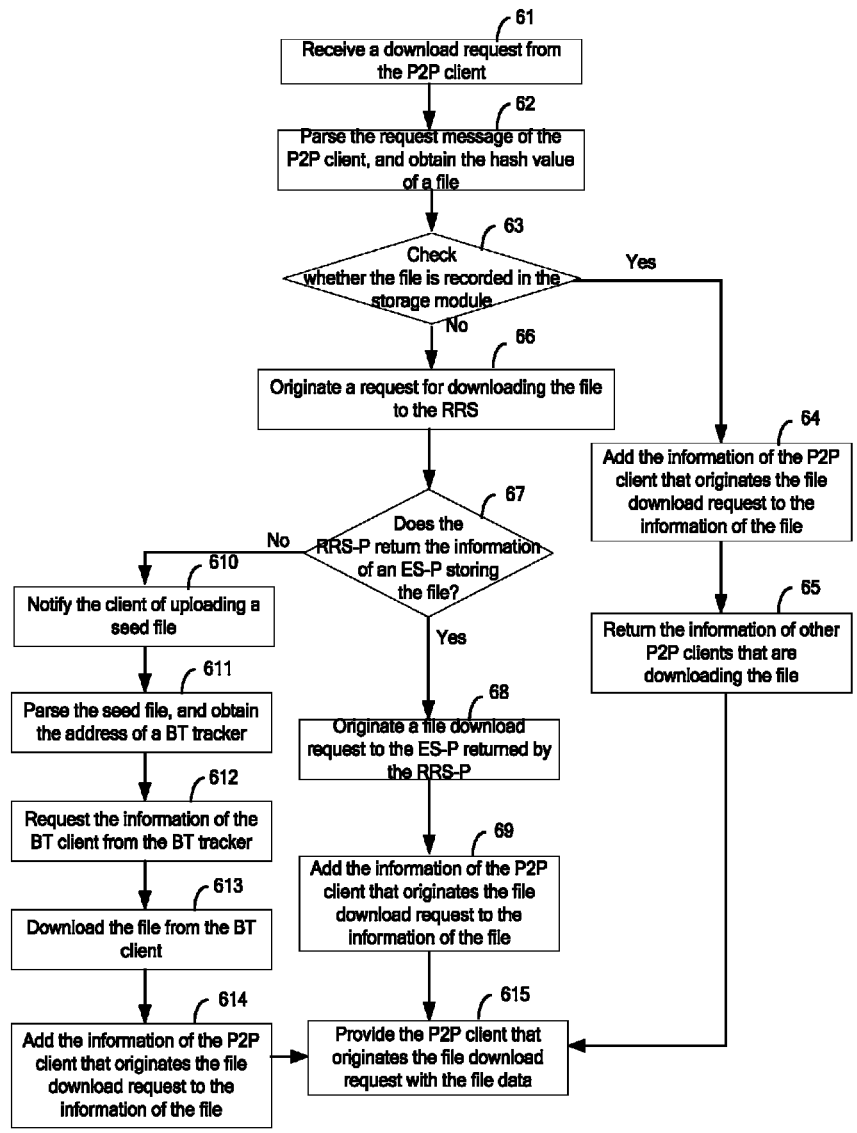
FIG. 6 is a flowchart illustrating the operating principle of the ES-P according to an embodiment of the present invention.

The operating principle of the ES-P is hereinafter described in detail on the basis of the preceding structure of the ES-P and with reference to FIG. 6.

Step 61: The ES-P obtains a file download request message (i.e., a third request message) of the P2P client through the first message interface between the P2P client and the ES-P, where the request message carries the hash value of a requested file.

Step 62: Parsing the third request message of the client to obtain the hash value of the file requested by the ES-P (i.e., the first file), and send the obtained hash value to the session managing module.

Step 63: The session managing module calls the storage module to check whether the first file is recorded. If so, the process proceeds to step 64; otherwise the process proceeds to step 66.

Step 64: The storage module adds the information of the P2P client that originates the file download request to the information of the file. Then, the process proceeds to step 65.

Step 65: Returning a response message to the P2P client that originates the file download request through the first message interface between the P2P client and the ES-P, where the response message carries the information of other P2P clients downloading the file. Then, the process proceeds to step 615.

Step 66: Sending the second request for downloading the first file to the RRS-P through the message interface between the ES-P and the RRS-P.

Step 67: Judging whether the RRS-P returns the information of an ES-P storing the first file through the message interface between the ES-P and the RRS-P. If so, the process proceeds to step 68; otherwise the process proceeds to step 610.

Step 68: Sending a request for downloading the first file to the ES-P returned by the RRS-P through the interface between the ES-Ps, where the request carries the hash value of the requested file, and obtaining the data of the first file from the ES-P. Then the process proceeds to step 69.

Step 69: The storage module adds the information of the P2P client that originates the file download request to the information of the file. Then, the process proceeds to step 615.

Step 610: Notifying the P2P client that originates the file download request of uploading a P2P protocol seed file through the first message interface between the P2P client and the ES-P. In this embodiment, supposing that the BT protocol is supported, this step is specifically notifying the P2P client that originates the file download request of uploading a BT seed file.

Step 611: The session managing module calls the parser to parse the BT seed file uploaded by the P2P client, and obtains the address of a BT tracker. According to the BT protocol, the BT tracker records other BT clients that are downloading the file at the same time, and the BT client connects to all or part of these recorded BT clients. Therefore, the BT tracker facilitates mutual connections of the BT clients.

Step 612: Sending a request to the BT tracker and obtaining the information of other BT clients that are downloading the first file through the message interface between the ES-P and the BT tracker.

Step 613: The ES-P downloads the first file from the BT clients through the second message interface between the ES-P and the P2P client. Then the process proceeds to step 614.

Step 614: The storage module adds the information of the P2P client that originates the file download request to the information of the file. Then, the process proceeds to step 615.

Step 615: Providing the P2P client that originates the file download request with the data of the first file.

On the basis of the preceding structure of the ES-P, the ES-P may further include the following: (For details, see Chinese Patent Application No. 200710089600.X)

a load reporter 56, adapted to collect ES-P loads, measure the ES-P loads, and report to the RRS-P.

a channel managing module 57, adapted to obtain and record basic information of live broadcast channels, and add or delete live broadcast channels; and an authentication and accounting module, adapted to authenticate and charge a connected P2P client.

In the preceding embodiment, if the RRS-P fails to return the address of an ES-P storing the first file in other ASs, the ES-P notifies the P2P client that originates the file download request of uploading a P2P protocol seed file; the session managing module calls the parser to parse the P2P protocol seed file (for example, a BT seed file) uploaded by the P2P client, and calls the second connection managing module to download the first file over a P2P transfer protocol.

If the RRS-P fails to return the address of an ES-P storing the first file in other ASs but the address of a content server that stores the first file is stored in the P2P client that originates the file download request, the ES-P may also obtain the address of the content server uploaded by the P2P client through the second connection managing module. In this case, the session managing module calls the second connection managing module to obtain the first file from the content server.

Figure 7:
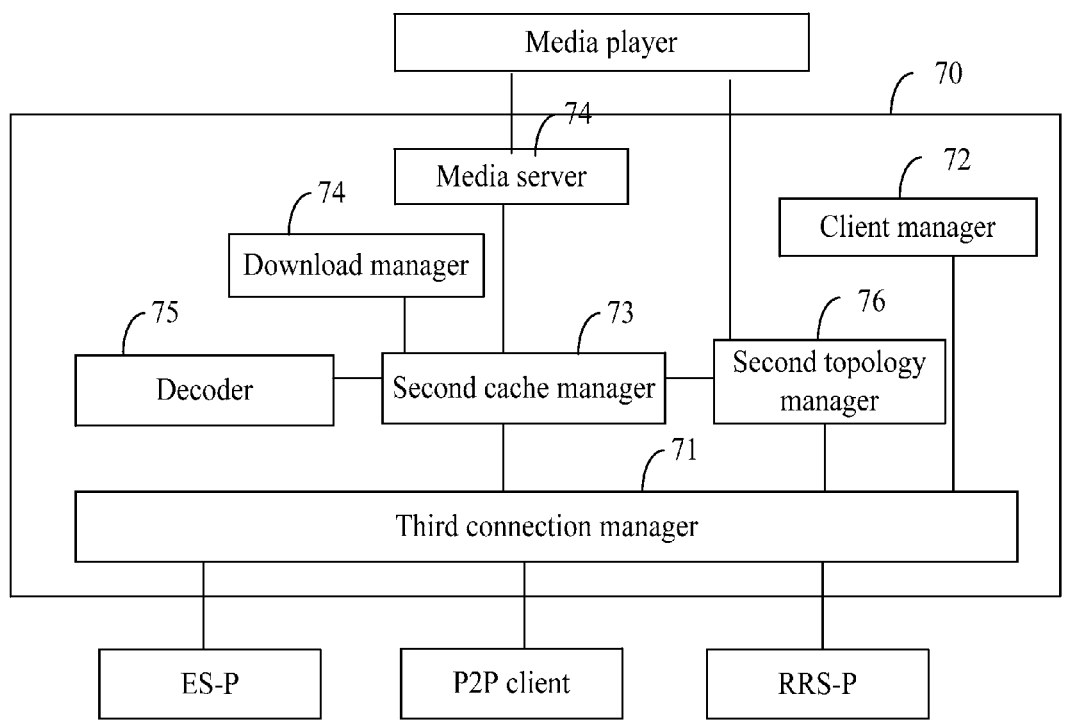
FIG. 7 shows a structure of a P2P client according to an embodiment of the present invention.

FIG. 7 shows a structure of a P2P client according to an embodiment of the present invention. As shown in FIG. 7, a P2P client 70 includes a third connection managing module 71, a client managing module 72, a second cache managing module 73, and a download managing module 74.

The third connection managing module 71 is adapted to manage external interfaces of the P2P client, including at least: the first message interface between the P2P client and an ES-P, the message interface between the P2P client and an RRS-P, and the message interface between P2P clients, which complies with related P2P transfer protocols. The third connection managing module 71 is further responsible for establishing, maintaining, and removing data connection and signaling connection channels; sending a network address translation (NAT) traversal message; and managing the mappings between addresses and IDs of ES-Ps, RRS-Ps, and P2P clients, and providing basic data transfer services;

The client managing module 72 is adapted to store the information of devices, which including at least information of a client or an ES-P, with data interactions of the P2P client. The client managing module may store the data in the format shown in Table 2. The client managing module calls the third connection managing module to interact with other P2P clients.

The second cache managing module 73 is adapted to cache the file data obtained by the third connection managing module.

The download managing module 74 is adapted to call the second cache managing module to write the file data from the second cache managing module into a storage device. An API interface may be used between the download managing module and the second cache managing module.

Figure 8:
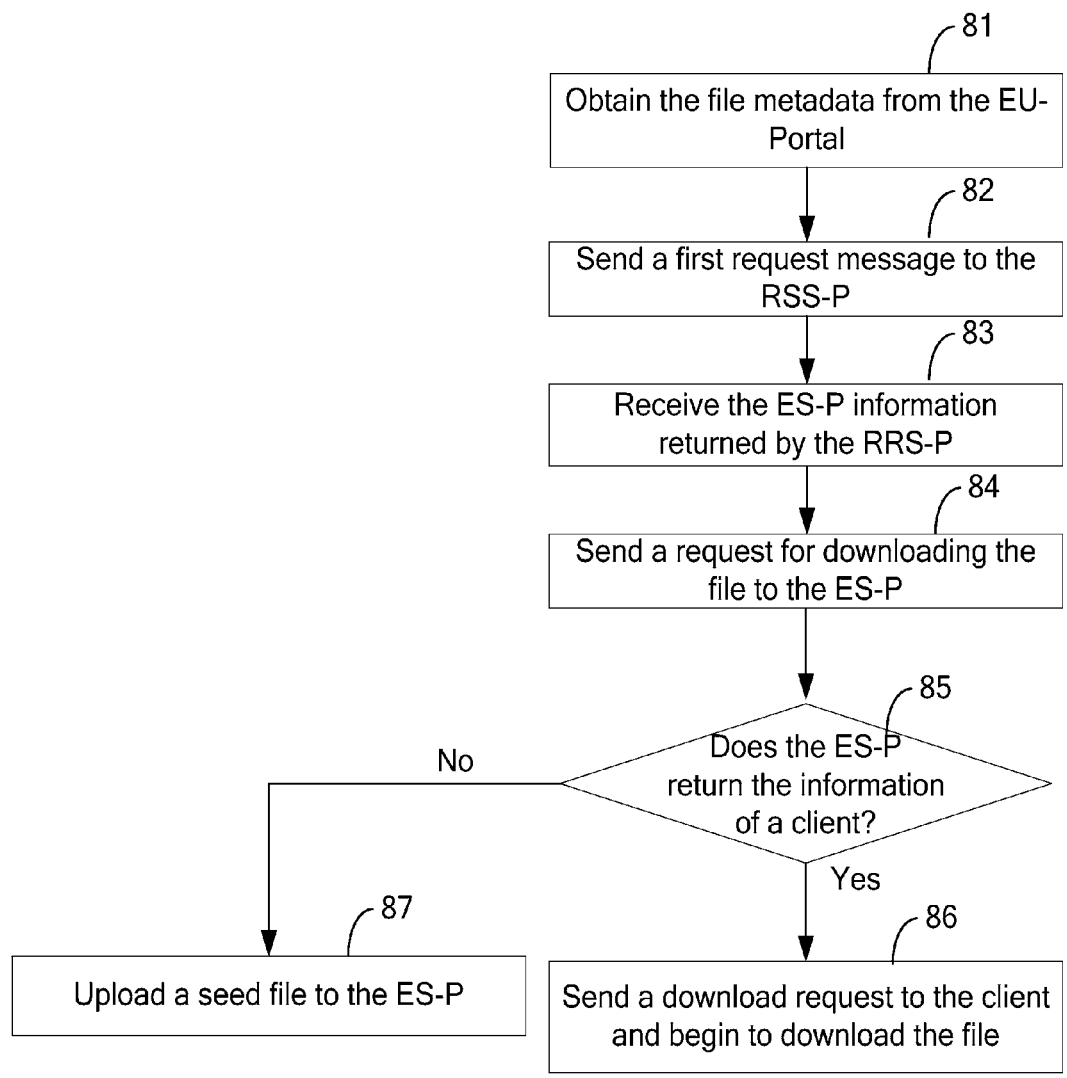
FIG. 8 is a flowchart illustrating the operating principle of a P2P client according to an embodiment of the present invention.

The operating principle of the P2P client is hereinafter described in detail on the basis of the preceding structure of the P2P client and with reference to FIG. 8.

Step 81: The P2P client obtains the metadata of a file through an end user portal (EU-Portal), generally a page.

Step 82: Sending the first request for downloading the file to the RRS-P through the message interface between the P2P client and the RRS-P.

Step 83: Receiving the ES-P information returned by the RRS-P through the message interface between the P2P client and the RRS-P.

Step 84: Sending a request for downloading the file to the ES-P through the first message interface between the P2P client and the ES-P.

Step 85: Judging whether the ES-P returns the information of a P2P client through the first message interface between the P2P client and the ES-P. If so, the process proceeds to step 86; otherwise the process proceeds to step 87.

Step 86: Sending a file download request to the P2P client returned by the ES-P, and beginning to download the file.

Step 87: Uploading a seed file to the ES-P through the first message interface between the P2P client and the ES-P.

On the basis of the preceding structure of the P2P client, the P2P client may further include: (See Chinese Patent Application No. 200710089600.X for details)

a decoder 75, adapted to decode the obtained slice data and recover the original packet;

a second topology managing module 76, adapted to monitor and adjust the P2P connection status with other network nodes; and a media server 77, adapted to send streaming data to a media player.

The following describes an embodiment by using the methods and devices according to the preceding embodiments.

Figure 9:
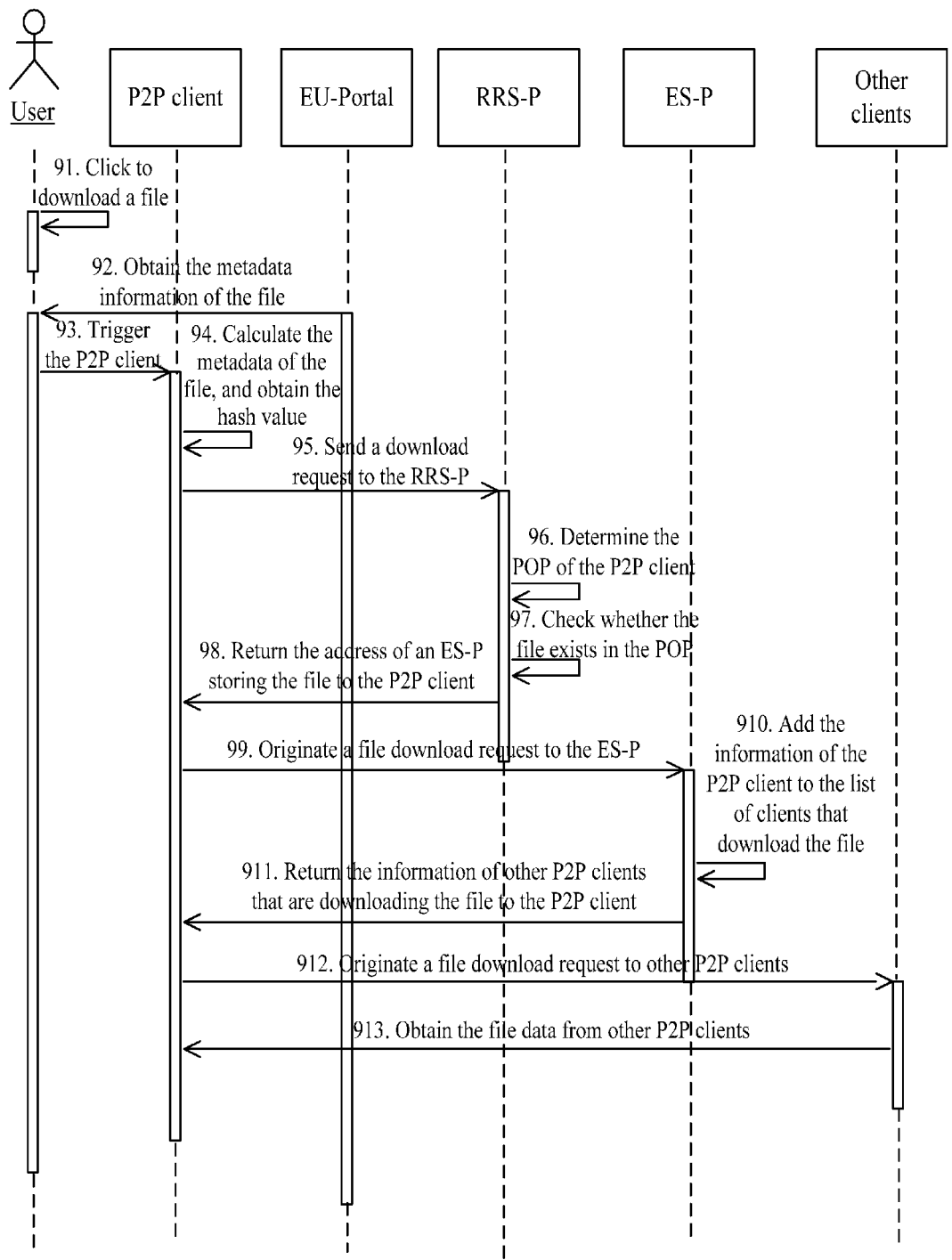
FIG. 9 is a schematic diagram of a normal download process according to an embodiment of the present invention.

FIG. 9 is a schematic diagram of a normal download process. The process includes the following steps:

Step 91: The user clicks to download a file.

Step 92: The user obtains the metadata information of the file from the EU-Portal.

Step 93: Triggering the P2P client program.

Step 94: The P2P client performs summary calculation on the metadata, and obtains the hash value of the file.

Step 95: The P2P client sends a file download request to the RRS-P, where the request carries the hash value of the file.

Step 96: The RRS-P determines the POP of the P2P client according to the IP address of the P2P client.

Step 97: The RRS-P checks whether the file exists in the POP of the P2P client.

Step 98: The RRS-P returns the address of an ES-P storing the file to the client. If the file does not exist in the POP, the process is the same as the cross-POP download process in FIGS. 10A and 10B.

Step 99: The P2P client sends a file download request to the ES-P, where the request carries the hash value of the file.

Step 910: The ES-P adds the information of the P2P client to the list of clients that download the file.

Step 911: The ES-P returns the information of other P2P clients that are downloading the file to the P2P client.

Step 912: The P2P client sends a file download request to other P2P clients that are downloading the file.

Step 913: The P2P client obtains the file data from other P2P clients that are downloading the file.

Figure 10A:
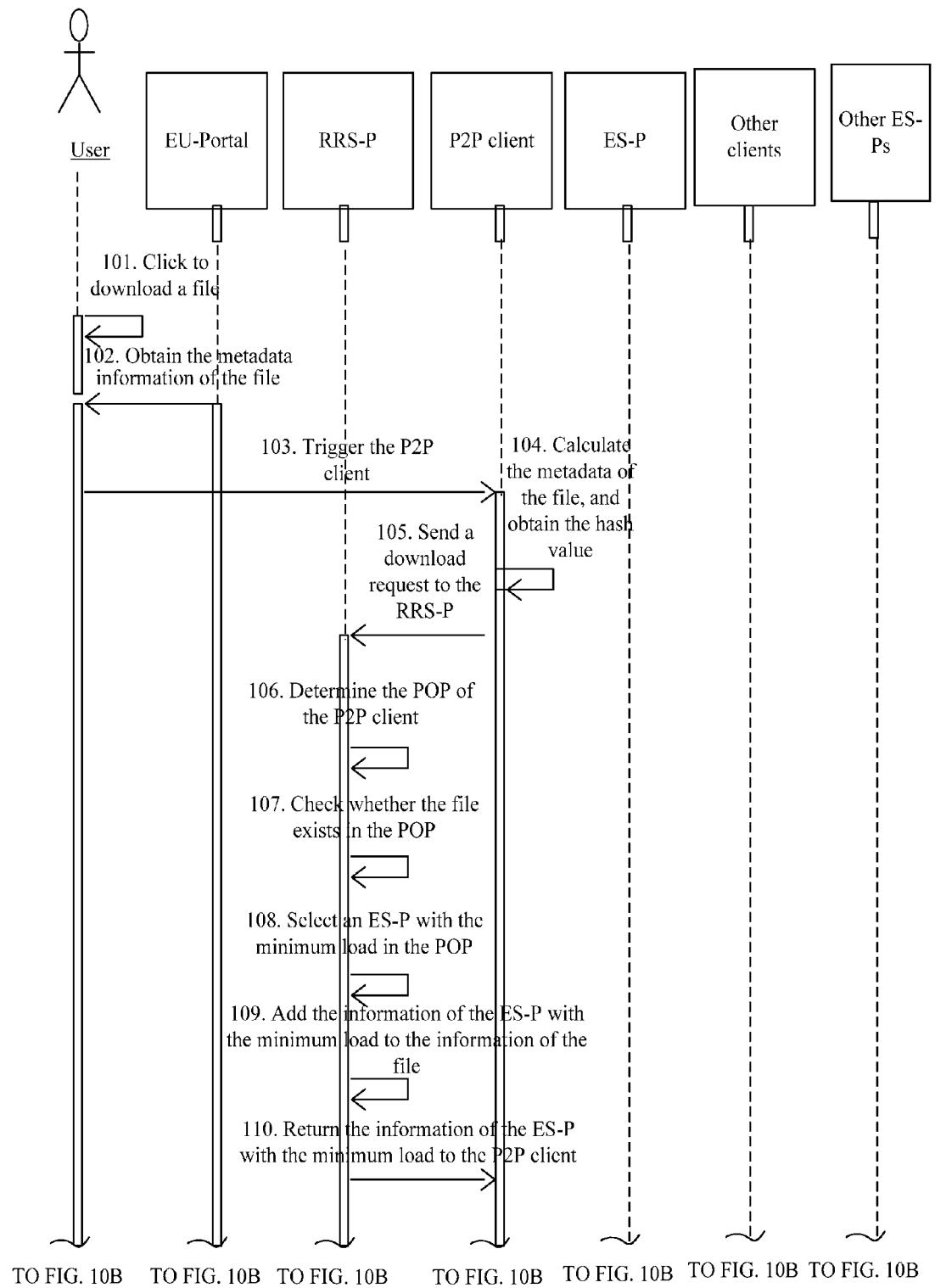
FIGS. 10A and 10B show a schematic diagram of a cross-POP download process according to an embodiment of the present invention.
Figure 10B:
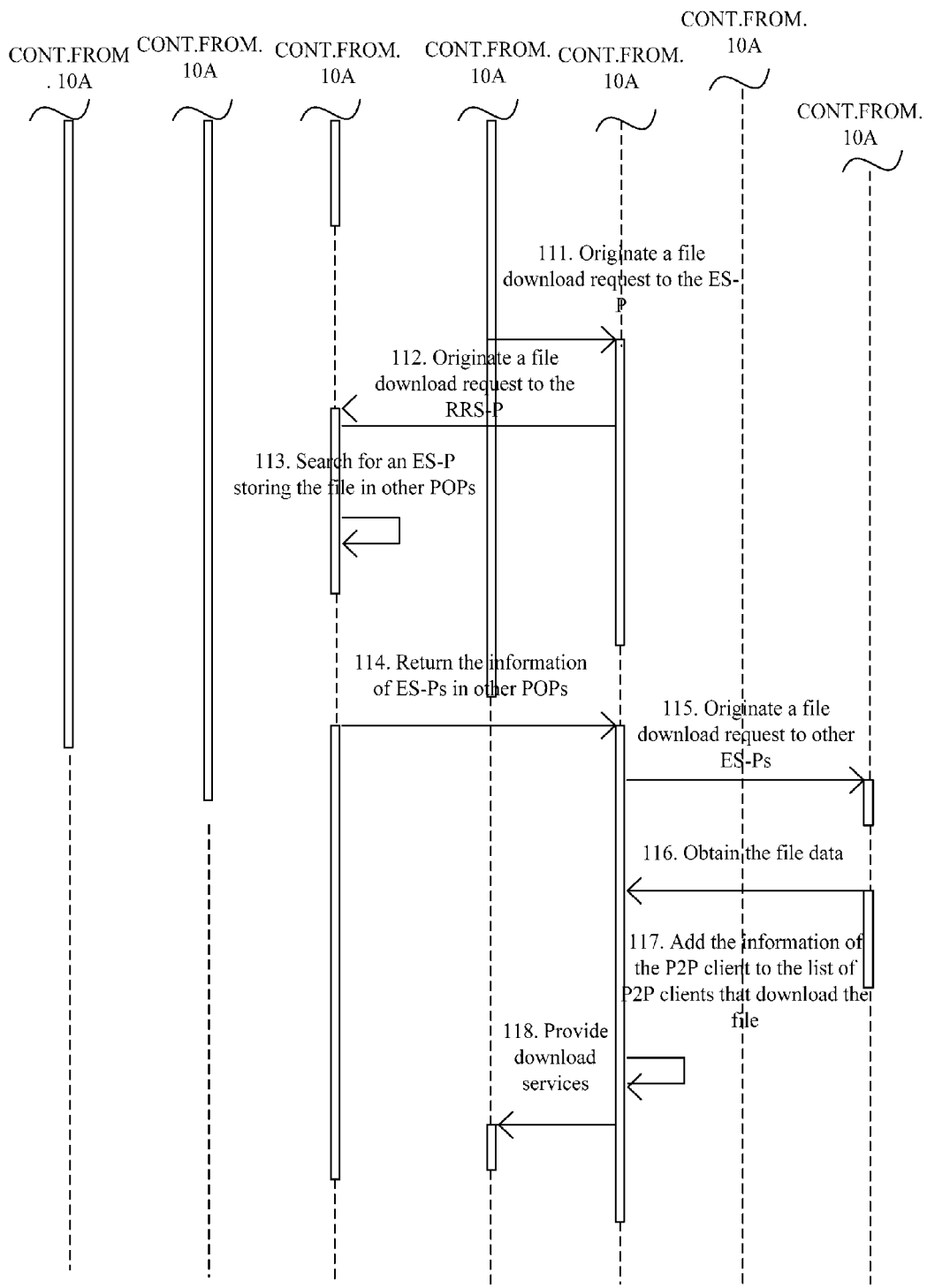

FIGS. 10A and 10B show a schematic diagram of a cross-POP download process according to an embodiment of the present invention.

Step 101: The user clicks to download a file.

Step 102: The user obtains the metadata information of the file from the EU-Portal.

Step 103: Triggering the client program.

Step 104: The P2P client performs summary calculation on the metadata, and obtains the hash value of the file.

Step 105: The P2P client sends a file download request to the RRS, where the request carries the hash value of the file.

Step 106: The RRS-P determines the POP of the client according to the IP address of the client.

Step 107: The RRS-P checks whether the file exists in the POP of the client.

Step 108: If the file does not exist in the POP, the RRS-P calculates the loads of ES-Ps in the POP, and selects an ES-P with the minimum load.

Step 109: The RRS adds the ES-P with the minimum load to the ES-P information of the file.

Step 110: Returning the ES-P information to the P2P client.

Step 111: The client sends a file download request to the ES-P, where the request carries the hash value of the file. The ES-P checks whether the file is stored locally. If so, the process is the same as the normal download process.

Step 112: If the file is not stored locally, the ES-P sends a file download request to the RRS-P.

Step 113: The RRS-P checks whether the file exists in other POPs.

Step 114: The RRS-P returns the information of ES-Ps in other POPs to the ES-P.

Step 115: The ES sends a file download request to the ES-Ps in other POPs, where the request carries the hash value of the file.

Step 116: The ES-Ps in other POPs transfer the file data to the requesting ES-P.

Step 117: Adding the information of the P2P client to the list of clients that download the file.

Step 118: Providing download services to the P2P client.

Figure 11A:
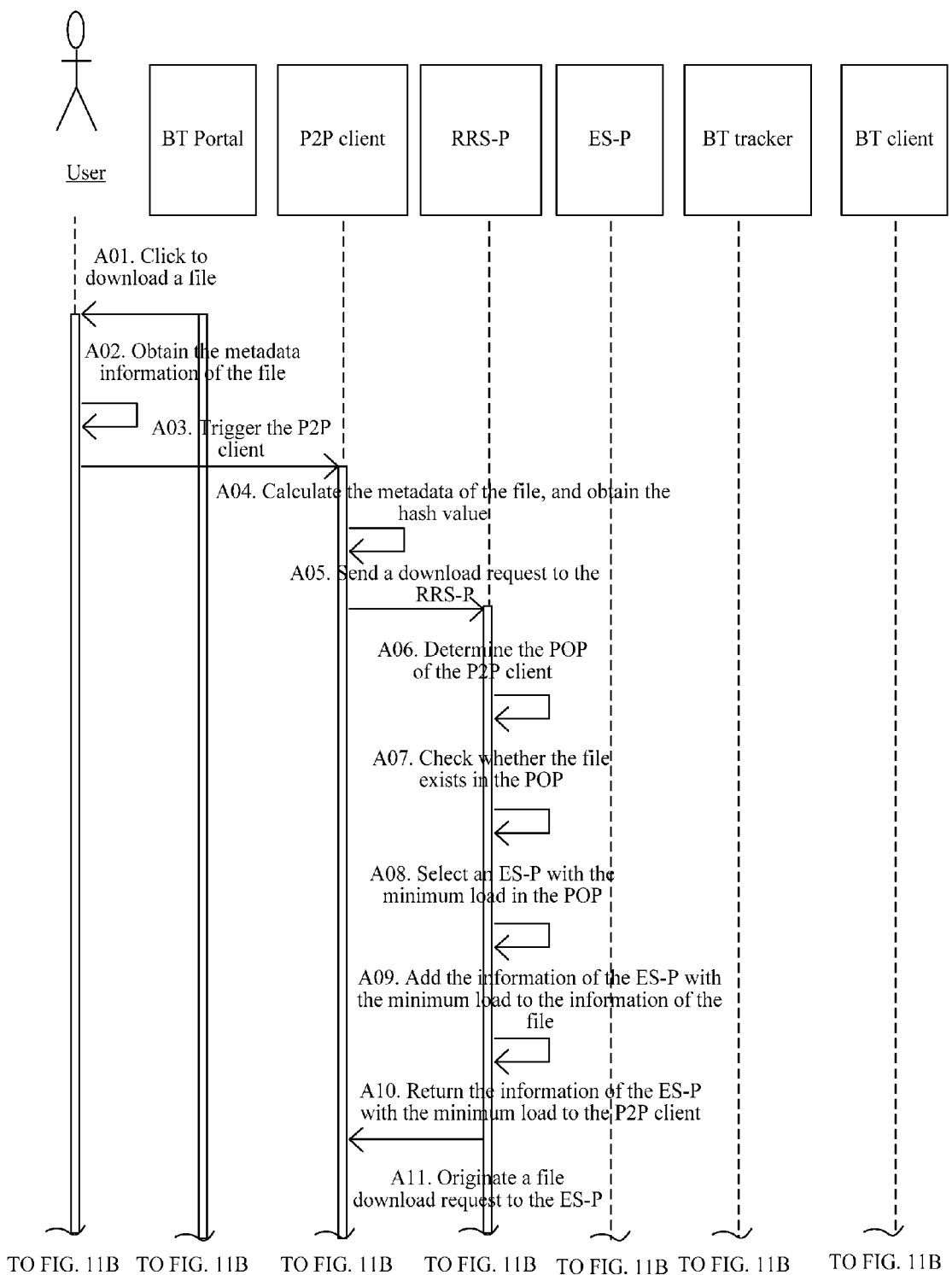
FIGS. 11A and 11B show a schematic diagram of a BT compatible download process according to an embodiment of the present invention.
Figure 11B:
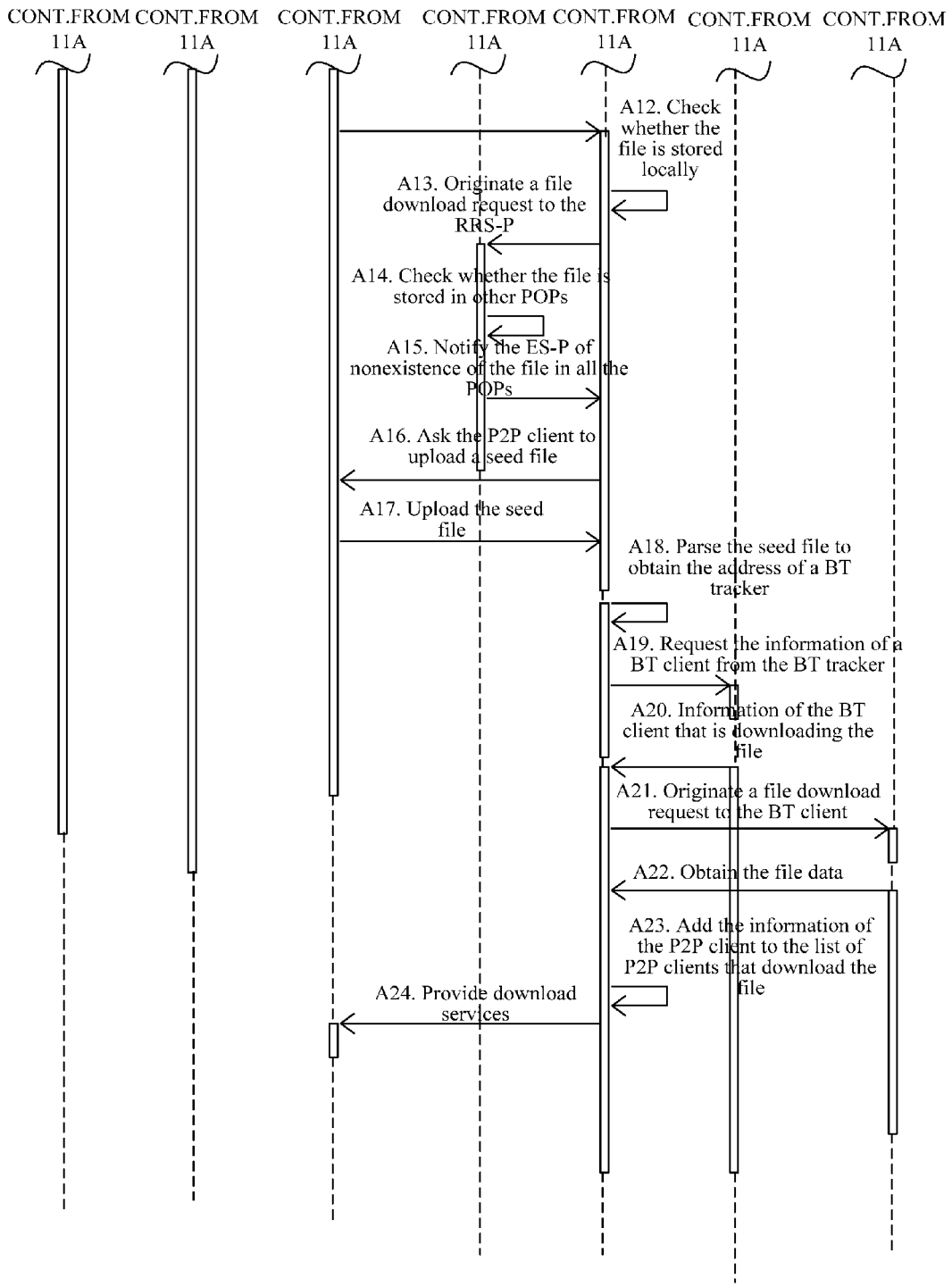

FIGS. 11A and 11B show a schematic diagram of a BT compatible download process according to an embodiment of the present invention. This embodiment supposes that the BT protocol is supported.

Step A01: The user obtains a BT seed file from the BT Portal.

Step A02: The user selects a file associated with the seed file for downloading.

Step A03: Triggering the P2P client program.

Step A04: The P2P client parses the seed file, and obtains the hash value of the file.

Step A05: The P2P client sends a file download request to the RRS-P, where the request carries the hash value of the file.

Step A06: The RRS-P determines the POP of the P2P client according to the IP address of the P2P client.

Step A07: The RRS-P checks whether the file exists in the POP of the P2P client. If so, the process is the same as the normal download process in FIG. 9.

Step A08: If the file does not exist in the POP, the RRS-P calculates the loads of ES-Ps in the POP, and selects an ES-P with the minimum load.

Step A09: The RRS-P adds the ES-P to the ES information of the file.

Step A10: Returning the ES-P information to the P2P client.

Step A11: The P2P client sends a file download request to the ES, where the request carries the hash value of the file.

Step A12: The ES checks whether the file is stored locally. If so, the process is the same as the normal download process.

Step A13: If the file is not stored locally, the ES-P sends a file download request to the RRS-P.

Step A14: The RRS-P checks whether the file is stored in other POPs. If so, the process is the same as the cross-POP download process in FIGS. 10A and 10B.

Step A15: Notifying the ES-P of nonexistence of the file in all the POPs.

Step A16: The ES-P asks the P2P client to upload the seed file.

Step A17: The P2P client uploads the seed file to the ES-P.

Step A18: The ES-P parses the seed file, and obtains the information of the BT tracker.

Step A19: Requesting the information of a BT client from the BT tracker.

Step A20: The BT tracker returns the information of the BT client that is downloading the file to the ES.

Step A21: The ES-P sends a file download request to the BT client.

Step A22: The BT client transfers the file data to the ES-P.

Step A23: Adding the information of the P2P client to the list of clients that download the file.

Step A24: The ES-P provides download services to the P2P client.

In the preceding embodiment, when the RRS-P notifies the ES-P of nonexistence of the file in all the POPs in step A15, the ES-P obtains a seed file uploaded by the P2P client, and obtains the file from the P2P client over the P2P transfer protocol after parsing the seed file in steps A16-A22. In the preceding embodiment, if the BT protocol is used, the P2P protocol is the BT protocol and the P2P client is a BT client.

In addition to the method in the preceding embodiment, when the RRS-P notifies the ES-P of nonexistence of the file in all the POPs in step A15, if the address of a content server storing the first file is stored in the P2P client that originates the file download request, the ES-P may also obtain the address of the content server uploaded by the P2P client, and obtain the file from the content server.

In the preceding method, if the file does not exist in the POP of the P2P client, the RRS-P calculates the loads of ES-PS in the POP, and selects an ES with the minimum load. During the implementation of the embodiments of the present invention, other policies may also be used to select an ES-P in the POP of the P2P client. For example, an ES-P with better server performance may be selected according to the server performance, an ES-P with a small network traffic volume may be selected according to the current network traffic status, or an ES-P that is closest to the P2P client is selected according to the network position where the P2P client is located. The present invention does not limit the specific selection policy.

According to the preceding embodiments of the present invention, the structure of the MDN in the prior art is used as follows: an RRS-P schedules the download request of a client to an ES-P in the POP; the ES-P records the information of all the clients that are downloading a same file within the POP; after receiving the download request of the client, an ES provides the client with file download services and information of other clients that are downloading the file. This restricts the data streams between clients to one POP, without any impact on backbone networks. In another embodiment of the present invention, an ES-P may also act as a P2P client to obtain the information of other P2P clients from the tracker and download files from other P2P clients; and then the ES-P provides the client in the POP with download services. This avoids data transmission between the client and BT clients, thus converging disordered streams.

It is understandable by those skilled in this art that all or part of steps in the methods of the preceding embodiments may be performed by hardware instructed by a program. The program may be stored in a computer readable storage medium, for example, a read-only memory or random access memory, a magneto disk, and a compact disk. When executed, the program includes the following steps: the user requests an RRS to obtain a first request message of a first client for downloading a first file, and determines the AS of the first client; the RRS searches the AS for an ES storing the first file, and returns the address of at least one ES storing the first file; and the ES obtains the request of the first client for downloading the first file, records the mapping between the information of the first client and the first file, and returns the information of other clients that download the first file to the first client according to the records in the ES.

What has been described is a method and device for distributing file data in embodiments of the present invention. Specific examples are given to describe principles and implementation modes of the present invention. The embodiments are intended to help understand the implementation modes of the present invention only, and not intended to limit the present invention. It is apparent that those skilled in the art can make various modifications and variations to the invention without departing from the spirit and scope of the invention.

What is claimed is:

1. A method for distributing file data, comprising the following computer-implemented operations:
obtaining a first request message for downloading a first file from a first client, and determining an autonomous system (AS) where the first client is located according to an address of the first client;
judging whether a first edge server supporting peer to peer (ES-P) which stores the first file exists in the AS, if the first ES-P exists in the AS, returning an address of the first ES-P storing the first file to the first client;
obtaining a third request for downloading the first file from the first client;
obtaining information of other clients that are downloading the first file in the AS, according to the third request and information about a mapping between the other clients and the first file recorded in the first ES-P; and
returning the information of the other clients to the first client;
wherein the method further comprises:
selecting a second ES-P in the AS according to a preset rule if the first ES-P storing the first file does not exist in the AS;
returning an address of the second ES-P to the first client;
receiving a second request message sent by the second ES-P;
recording a mapping between the second ES-P that forwards the second request message and the first file, and returning an address of a third ES-P storing the first file in another AS to the second ES-P that forwards the second request message; and
obtaining the first file from the third ES-P storing the first file, and sending the first file to the first client.

2. The method of claim 1, further comprising:
after receiving the second request message for downloading the file forwarded by the second ES-P,
if no ES-P storing the first file is found in the another AS, downloading, by the second ES-P, the first file over a peer-to-peer transfer protocol according to a seed file sent by the first client, and sending the first file to the first client.

3. The method of claim 1, further comprising:
after receiving the second request message for downloading the file forwarded by the second ES-P,
if no ES-P storing the file is found in the another AS, downloading, by the second ES-P, the first file from a content server storing the first file according to an address of the content server sent by the first client and sending the first file to the first client.

4. The method of claim 1, wherein the selecting the second ES-P in the AS according to the preset rule comprises:
selecting the second ES-P with a minimum load in the AS.

5. An edge server (ES) apparatus, comprising:
a second connection managing module configured to manage data interactions with external interfaces, the data interactions comprising: receiving a third request message for downloading a first file from a first client, and returning information of other clients downloading the first file to the first client;
a storage module configured to record a mapping between information of the other clients that are downloading the first file and an identifier (ID) of the first file in an autonomous system (AS) where the first client is located; and
a session managing module configured to obtain the ID of the first file carried in the third request message, and search the storage module for the information of the other clients downloading the first file according to the ID of the first file,
wherein the ES apparatus further comprises a first cache managing module, wherein:
the session managing module is further configured to trigger the second connection managing module to send a second request message for downloading the first file to a request routing system supporting peer to peer (RRS-P) if the session managing module finds no client downloading the first file in the AS;
the data interactions further comprise: obtaining an address of an ES supporting peer to peer (ES-P) in another AS returned by the RRS-P, obtaining the first file from the ES-P in the another AS, and sending the data of the first file cached in the first cache managing module to the first client;
the first cache managing module is configured to cache and manage the data of the first file obtained by the second connection managing module; and
the storage module is further configured to record a mapping between the information of the first client and the ID of the first file,
wherein the second connection managing module is further configured to obtain a peer-to-peer protocol seed file sent by the first client if the RRS-P fails to return the address of the ES-P address in the another AS, and obtain the first file;
the ES apparatus further comprises: a parser configured to parse the peer-to-peer protocol seed file obtained by the second connection managing module, and invoke the second connection managing module to obtain the first file over the peer-to-peer protocol according to a parsing result.

* * * * *